May 19, 1936.  C. F. GERLINGER  2,040,932
CAR AXLE DRIVE
Filed Oct. 22, 1934  3 Sheets-Sheet 1
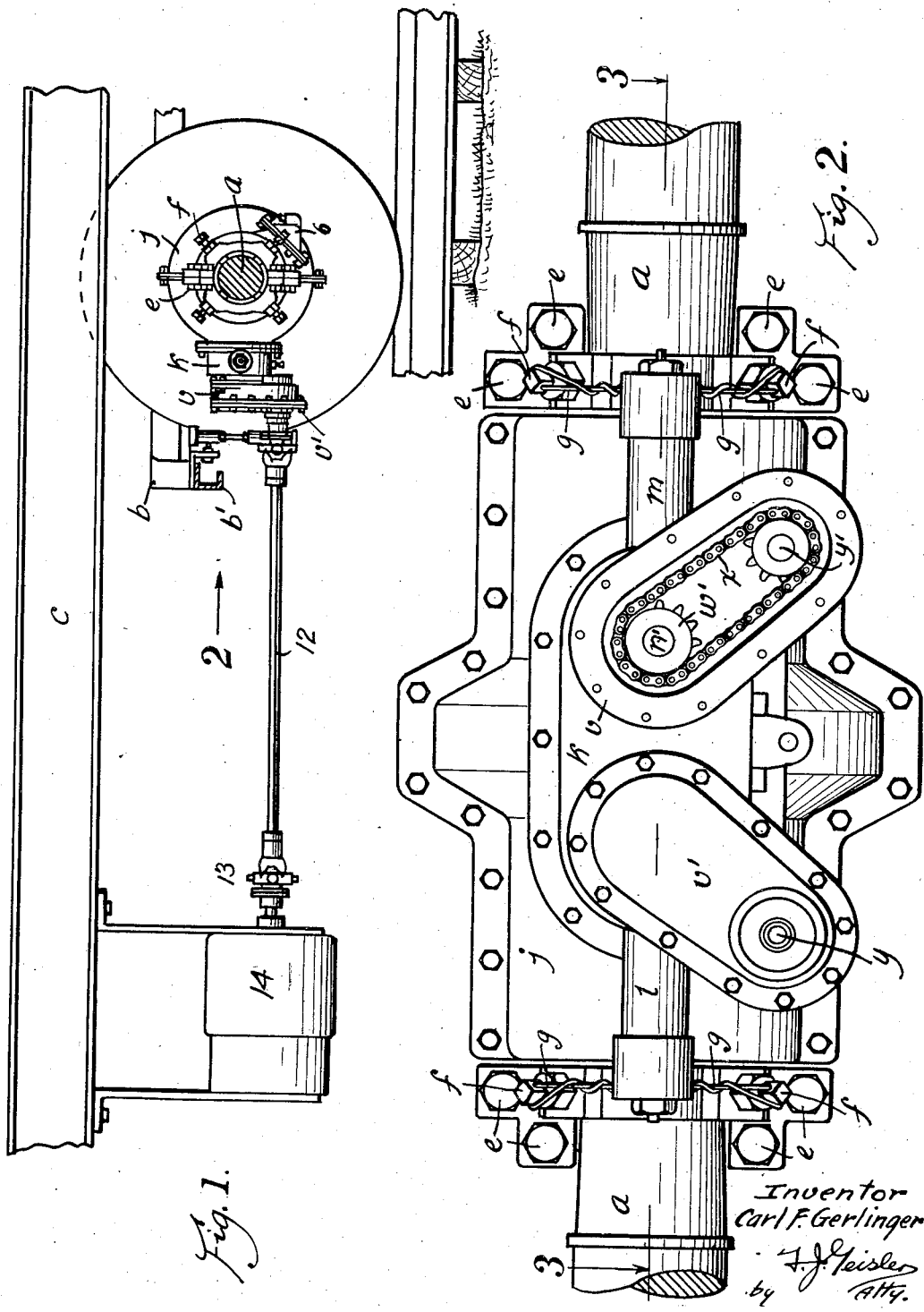

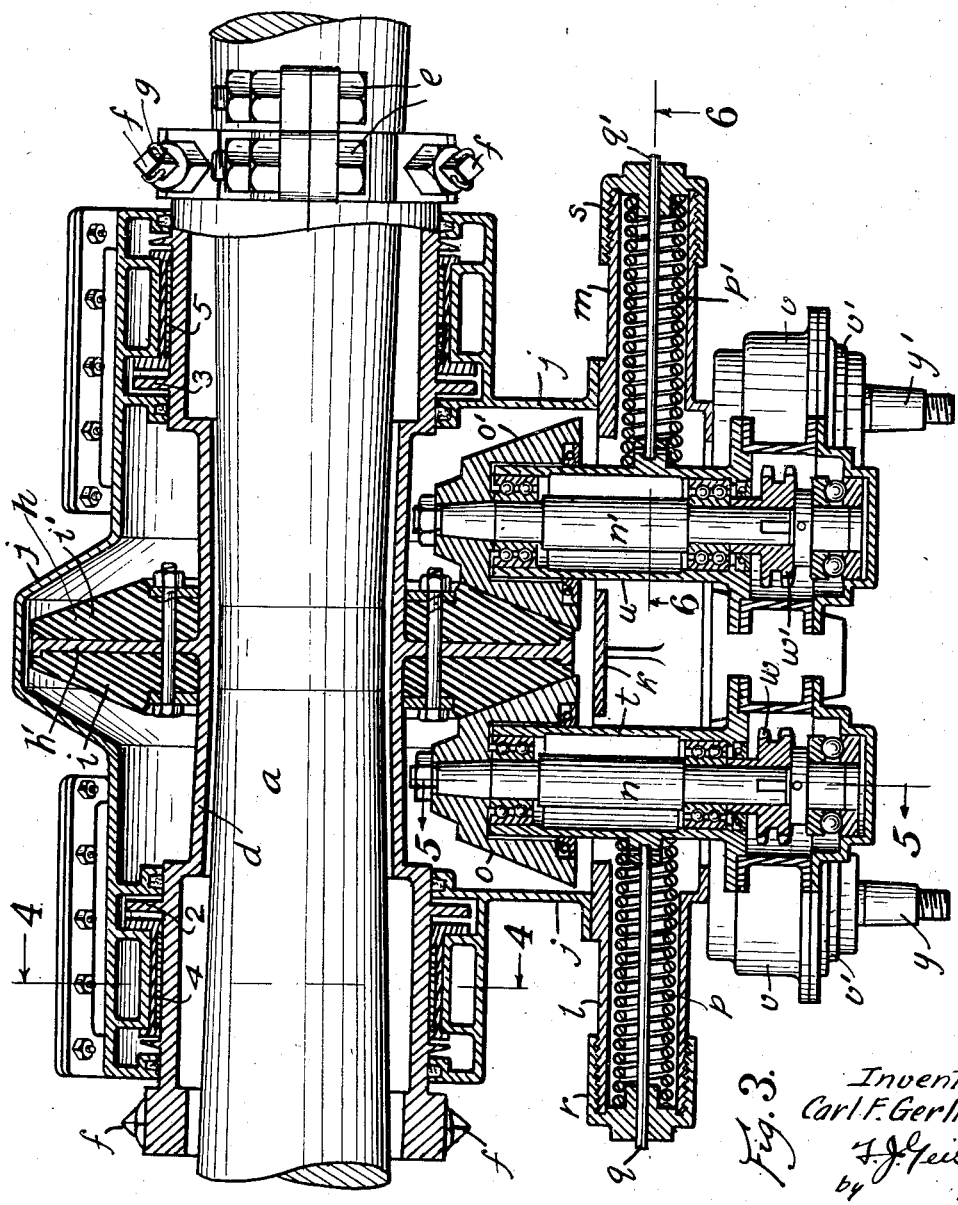

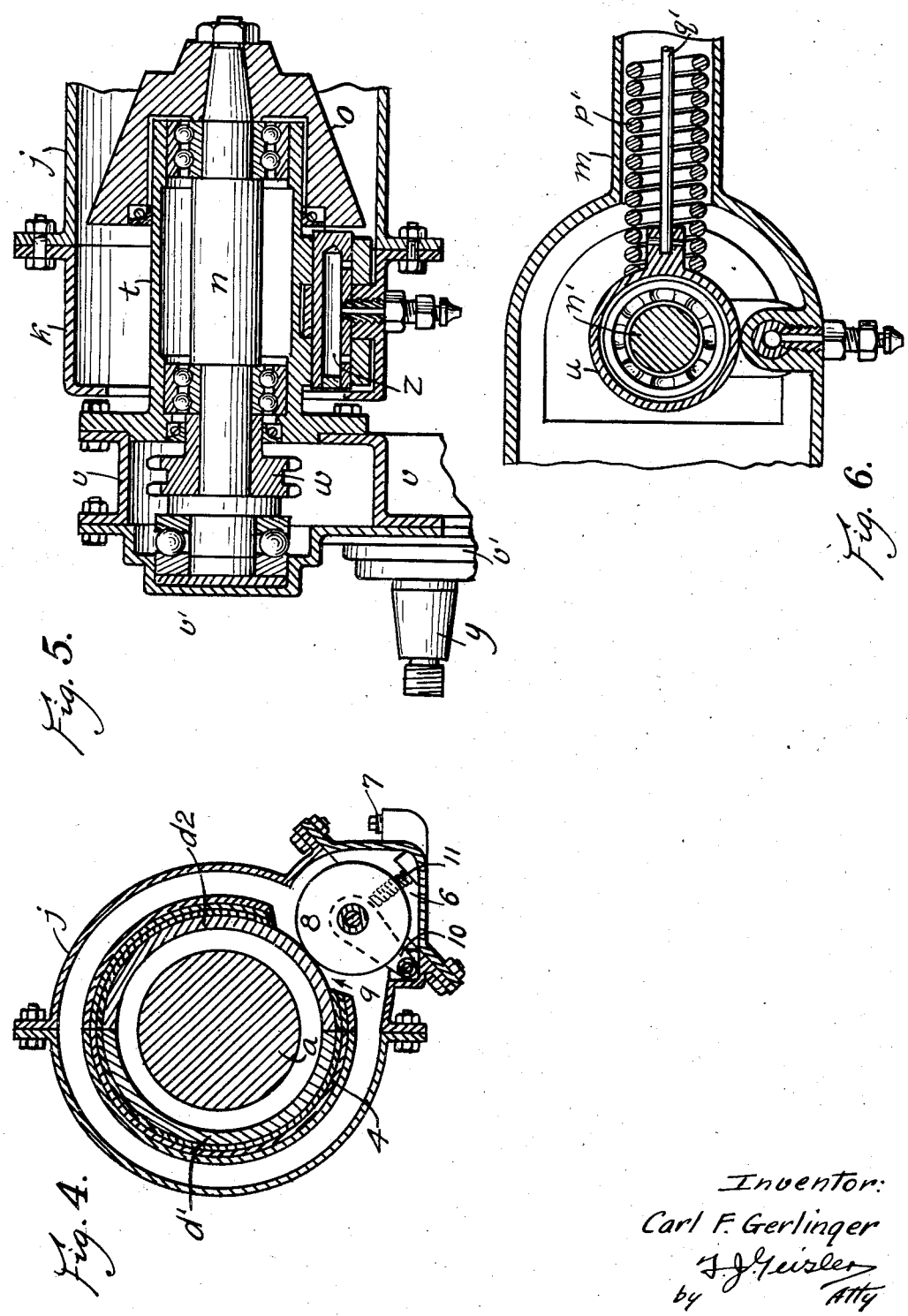

Patented May 19, 1936

2,040,932

UNITED STATES PATENT OFFICE 2,040,932

CAR AXLE DRIVE

Carl F. Gerlinger, Dallas, Oreg.

Application October 22, 1934, Serial No. 749,409

5 Claims. (Cl. 74—209)

My invention relates to car axle drives utilizing the rotation of the wheel axle of the railway car for driving a generator of an electric car light system, or of an air conditioning system or other equipment.

The particular object of my invention is to provide a drive which may be mounted upon a standard car axle without having first to remove the wheels, or performing preliminary work on the axle, such as required in mounting the car axle drive described in my Patent No. 1,884,657, dated October 25, 1932.

A further object of my invention is so to arrange my car axle drive as to drive two units of devices, with the driven shafts of these units located so as to pass under the adjacent cross member, or so-called end-sill of the car truck; in that way obtaining a simple, efficient direct drive construction.

By my invention I provide a car axle drive adapted to be mounted on the car axle in spaced relation therewith by means—specifically set screws—adjustable to effect accurate axial alignment of the power transmitting devices with the car axle.

A further object of my invention is to provide simple but effective means whereby the relative lateral movements of the power transmitting elements of the drive are restrained, thereby to avoid misalignment and the excessive wear thereby caused.

A further object of my invention is to provide a car axle drive which is compact and of simple, durable construction, with the parts thereof so arranged as to permit ready inspection and adjustment without disassembling of the drive as a whole.

The means employed by me for attaining the above mentioned and incidental features of my car axle drive, and the details of construction and mode of operation are hereinafter described with reference to the accompanying drawings.

In the drawings:

Fig. 1 shows a fragmentary side elevation of a portion of a car truck frame with one of the car axles having my drive mounted thereon and connected with a device operated by my drive;

Fig. 2 shows a larger scaled elevation of my drive including a portion of a car axle looking in the direction pointed by the arrow 2 in Fig. 1;

Fig 3 is a sectional plan view taken on the line 3—3 of Fig. 2, with certain portions of the housing shown in full and this figure also illustrating the clamping means for mounting the axle sleeve member of my drive on the axle.

Fig. 4 shows a vertical, transverse section taken on the line 4—4 of Fig. 3;

Fig. 5 shows a vertical section taken on the line 5—5 of Fig. 3; and

Fig. 6 is a fragmentary vertical section taken on the line 6—6 of Fig. 3.

$a$ represents the car axle on which is mounted a truck frame $b$ of the usual construction, the truck frame supporting the car frame $c$, as usual. On the car axle $a$ is rigidly mounted in spaced relation an axle sleeve $d$ (Fig. 3). The axle sleeve is longitudinally divided into parts $d'$, $d2$, as shown by Fig. 4, the parts being firmly bolted together by bolts $e$, as shown in Figs. 2 and 3. The mounting means may consist of inwardly and radially projecting set or clamping screws $f$ (Figs. 2 and 3), and the set screws may be secured against reverse turning and loosening by a wire locking member $g$, as indicated in Fig. 2. The axle sleeve $d$ constitutes the hub of the friction wheel $h$. This friction wheel $h$ may be formed by casting on the axle sleeve $d$ a circumferential flange or web $h'$ and bolting on the opposite faces of said flange $h'$ the friction rings $i$, $i'$. The axle sleeve $d$ is inclosed by a divided housing $j$. The front side of the housing $j$ is open and has a flange to which is bolted the housing section $k$, and housing section $k$ is provided with lateral tubular housing portions $l$ and $m$. On opposite sides of the drive friction wheel $h$ are located shafts $n$, $n'$, journaled in anti-friction bearings provided in tubular housings $t$, $u$, and on the shafts $n$, $n'$ are mounted friction cones $o$ and $o'$ which are maintained in operative contact with friction rings $i$, $i'$ of the drive wheel $h$ by springs $p$, $p'$ inclosed in said lateral tubular housing portions $l$, $m$. Friction wear indicators consisting of rods $q$, $q'$ extend outwardly thru a centrally located hole in each of the caps $r$, $s$ of the lateral housing portions $l$, $m$, as shown in Fig. 3. The tubular housings $t$, $u$, through the medium of lugs, are pivoted on pins $z$ on their lower sides to the housing $k$, as shown in Fig. 5. On the shafts $n$, $n'$ are mounted sprockets $w$, $w'$, respectively. On the tubular housings $t$, $u$ are mounted the housings $v$ inclosing the sprockets $w$, $w'$, sprocket chains $x$ and driven shafts $y$, $y'$; the housing $v$ having removable covers $v'$, and the driven shafts $y$, $y'$ being journaled in the housings $v$.

The axle sleeve $d$ is provided at its ends with peripheral flanges 2, 3 which serve as retainers for bearings, 4, 5, and also serve to hold the various operating parts of the drive in proper alignment and to resist displacement of such alignment due to the thrust which would be imposed if the cooperating friction surfaces of the drive wheel and driven shafts n, n' should become damaged or unduly worn.

In order to provide for efficient lubrication between the bearing surfaces of the axle and its housing, I prefer to provide at the ends of the housing j an oil sump 6 (Fig. 4) filled thru an inlet 7 in which rotates an oil-wheel 8 in contact with the underside of the axle sleeve d thru an opening 9 in the bearings 4 and 5. The oil wheel 8 is carried by a fork 10 shown in dotted line and the oil wheel is held in contact with the axle sleeve by a coil spring 11. Parts not specifically described are mere mechanical features used in the construction of my drive which may be constructed and arranged as shown by the drawings.

As evident from Figs. 2 and 3, the driven shafts y, y' are laterally, outwardly offset from the friction cone shafts n, n' and thus carry the transmitted power to locations which will permit the operation simultaneously of independent devices without interferences with each other, and furthermore, the connection from the driven shafts y, y', as indicated by 12 (Fig. 1) and their coupling therewith with a storage battery or other driven device as indicated by 13 and 14 is so located as to pass under the sill b' of the truck frame b.

I claim:

1. In a car axle drive a longitudinally divided sleeve adapted to be mounted on a car axle, means for securing said sleeve rigidly in place on said axle, and a friction drive wheel carried centrally by said sleeve; a power transmitting shaft journaled on each of opposite sides of said drive wheel and perpendicular to the axis of said car axle; means including independently movable bearings supporting each power transmitting shaft for movement parallel to the longitudinal axis of said car axle, each of such shafts carrying a friction-cone engaging said drive wheel; means, including springs, holding said friction-cones in operative contact with said drive wheel; a power takeoff shaft journaled below each of said power transmitting shafts; driving connections between the said related power transmitting and power takeoff shafts.

2. In a car axle drive a longitudinally divided sleeve adapted to be mounted on, and in spaced relation with a car axle, means for securing said sleeve rigidly in place on said axle, and a friction drive wheel carried centrally by said sleeve; a power transmitting shaft journaled on each of opposite sides of said drive wheel and perpendicular to the axis of said car axle; means including independently movable bearings supporting each power transmitting shaft for movement parallel to the longitudinal axis of said car axle, each of such power transmitting shafts carrying a friction-cone engaging said drive wheel; means, including springs, holding said friction-cones in operative contact with said drive wheel; a sprocket carried by each of said power transmitting shafts, a power take off shaft journaled below each of said power transmitting shafts; a sprocket carried by each of said power takeoff shafts, and sprocket chains connecting the power transmitting shaft to the power takeoff shaft.

3. A car axle drive comprising a longitudinally divided sleeve rigidly mounted on the car axle, a friction drive wheel carried centrally by said sleeve, a main housing section inclosing said sleeve and drive wheel, such housing section having an open side; a complementary housing section secured to and inclosing said open side of the main housing section; a power transmitting shaft journaled on each of opposite sides of said drive wheel and perpendicular to the axis of said axle; means including bearings, provided in independently laterally movable tubular housing sections slidably supported in said complementary housing section, said tubular housing sections supporting each power transmitting shaft for movement, parallel to the axis of said axle; each of said power transmitting shafts carrying a friction-cone engaging said drive wheel; means, including springs, holding said friction-cones in operative contact with said drive wheel; the said tubular housing sections including pendent housing portions; a power takeoff shaft journaled in the lower part of each of said pendent housing portions, and driving connections between the said related power transmitting and power take-off shafts.

4. A car axle drive comprising a longitudinally divided sleeve rigidly mounted on the car axle, a friction drive wheel carried centrally by said sleeve, a main housing section inclosing said sleeve and drive wheel, such housing section having an open side; a complementary housing section secured to and inclosing said open side of the main housing section; a power transmitting shaft journaled on each of opposite sides of said drive wheel and perpendicular to the axis of said axle; means including bearings, provided in independently laterally movable tubular housing sections slidably supported in said complementary housing section, said tubular housing sections supporting each power transmitting shaft for movement, parallel to the axis of said axle; each of said power transmitting shafts carrying a friction-cone engaging said drive wheel; means, including springs holding said friction-cones in operative contact with said drive wheel; the said tubular housing sections including pendent housing portions; a sprocket carried by each of said power transmitting shafts within the upper part of each pendent housing portion, a power takeoff shaft journaled in the lower part of each of said pendent housing portions; a sprocket carried by each of said takeoff shafts, and sprocket chains connecting the sprockets in each of said pendent housing portions.

5. The combination described by claim 3 with the opposite ends of said axle sleeve having peripheral flanges constituting retainers, and the ends of said main sleeve housing section provided with parts abutting with said retainers, whereby the relative lateral movements of the driven shafts and power transmitting elements are limited.

CARL F. GERLINGER.